April 28, 1970 K. H. SINDEN 3,509,548
MATRIX STORE WITH DELAY MEANS IN THE INTERROGATION CIRCUIT
Filed May 3, 1966
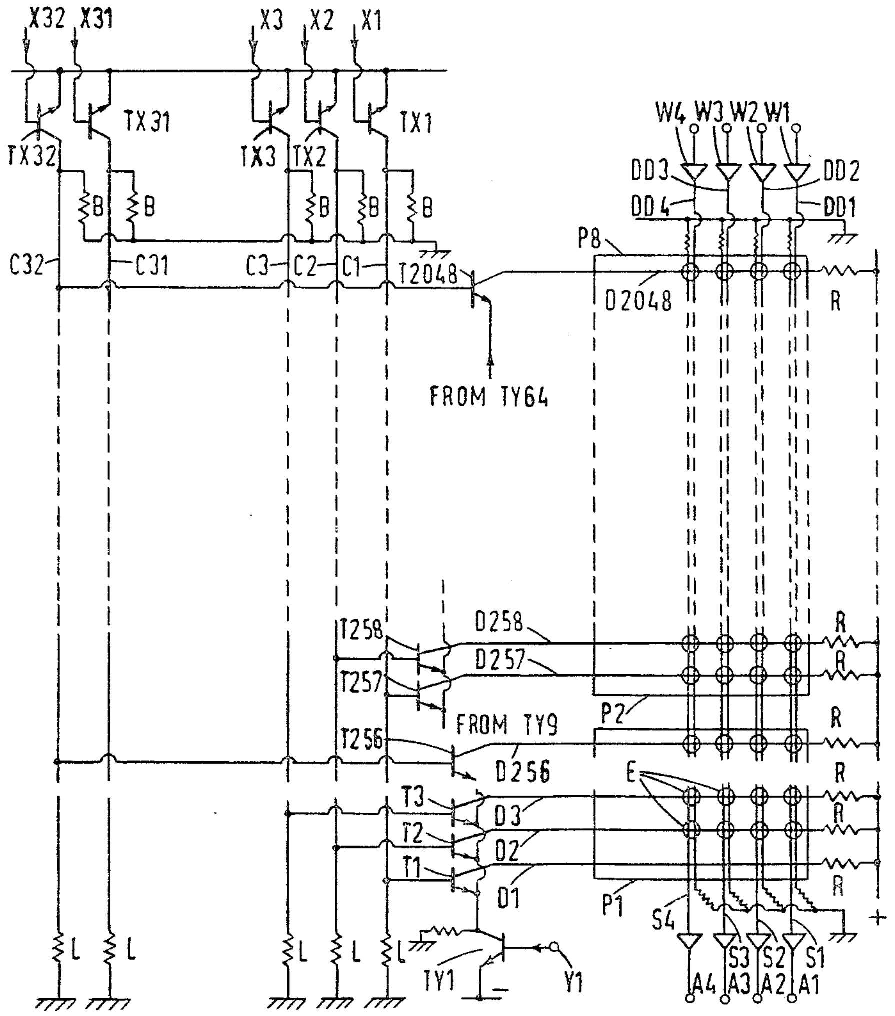

United States Patent Office 3,509,548

Patented Apr. 28, 1970

3,509,548

MATRIX STORE WITH DELAY MEANS IN THE INTERROGATION CIRCUIT

Kenneth Harry Sinden, Richmond, England, assignor to Electric & Musical Industries Limited, Hayes, Middlesex, England, a company of Great Britain Filed May 3, 1966, Ser. No. 547,297

Claims priority, application Great Britain, May 11, 1965, 19,765/65

Int. Cl. G11c *9/00, 11/02*

U.S. Cl. 340—174 6 Claims

ABSTRACT OF THE DISCLOSURE

A matrix store is disclosed which comprises an array of storage elements made up of a plurality of groups of storage elements, interrogating means for applying an interrogating signal to a respective group, a plurality of sense conductors for obtaining signals representing data from an interrogated group, a read amplifier connected to each sense conductor, the data signals appearing at the read amplifiers after a first time interval dependent on the length of the sense conductors from the respective group to the read amplifiers, said first time interval being different for different groups, the selection means including delay means for delaying the application of the interrogating signal for a second time interval complementary to said first so that the sum of said time intervals is substantially constant whichever group is interrogated.

The present invention relates to matrix stores.

In the operation of a matrix store it is found that the presence of differing lengths of conductors to different storage elements of the store gives rise to variation in the interval of time between the reaction of a storage element and the appearance of a corresponding output signal in a reading circuit. For high speed operation of the matrix store or if the matrix store is a large one, or both, this variation in time interval can be troublesome especially if it is desired to strobe the output signals of the store to remove undesirable signal components.

It is an object of the present invention to reduce the above difficulty.

According to the present invention there is provided a matrix store (a) Including an array of storage elements comprising a plurality of groups of said storage elements, (b) Interrogating means for applying an interrogating signal to a respective group of storage elements, (c) A plurality of sense conductors associated with said storage elements for obtaining signals representing data from an interrogated group of storage elements, (d) A read amplifier connected to each of said sense conductors, (e) The data signals appearing at said read amplifiers after a first time interval depending on the length of the sense conductors from the respective group of storage elements to the read amplifiers, said first time interval being different for different groups of storage elements, (f) Selection means for causing said interrogating means to apply an interrogating signal to a selected group of storage elements, (g) Said selection means including delay means for delaying the application of the interrogating signal to the selected group of storage elements after initiation of the operation of said selection means by a second time interval complementary to said first time interval for the respective group of storage elements, so that (h) The sum of said first mentioned time interval and said second mentioned time interval is substantially constant whichever group of storage elements is interrogated.

In one embodiment of the invention, the interrogating means include drive conductors, one for each group of storage elements and said selection means include delay lines in which the lumped capacities are provided by the input circuits of said interrogating means.

In order that the invention may be fully understood and readily carried into effect it will now be described with reference to the accompanying drawing the single figure of which shows in diagrammatic form one example of the invention.

Referring now to the drawing, 2048 rows of thin film magnetic elements E are disposed on eight panels P1, P2 . . . P8. Each row of elements E is capable of storing a binary word of, say, 40 bits, although in the drawing only four elements are shown in each row. Moreover, for clarity many of the 2048 rows are omitted from the drawing. Associated with one element of each row are a respective digit drive conductor DD and a respective sense conductor S, four such digit drive conductors DD1, DD2, DD3 and DD4 and four such sense conductors S1, S2, S3 and S4 being shown in the drawing. Associated with each row of elements E there is a drive conductor D, there being 2048 such drive conductors.

In the operation of such a store the magnetic elements E, which are uni-axially anisotropic, have their easy axes of magnetisation parallel to the drive conductors D, so that application of a drive signal to a selected drive conductor D tends to hold the magnetic vectors of the elements coupled therewith transverse to the easy axis in a particular sense. During writing, a drive signal is applied to a selected one of the drive conductors D to select a row or so called address in the store. A digit signal of appropriate polarity is also applied by respective writing amplifier W to each digit drive conductor DD, and, whilst the digit signals are still applied to the conductors, the drive signal applied to the selected drive conductor D is terminated so that the magnetic vectors of the elements of the row associated with the driven conductor D rotate to be parallel to the easy axis of magnetisation of the elements in a direction dependent on the polarity of the respective digit signals. During reading, an interrogating signal is applied to a selected drive conductor D and this causes rotation of the magnetic vectors of the elements E associated with that drive conductor, so as to induce signals in the sense conductors S the polarities of which represent the digits stored in the respective elements E. In practice a reading and writing operation are both performed in response to a single pulse, the means for applying a signal to a selected drive conductor functioning at different times as interrogating means and conditioning means.

The store shown in the drawing is of the type known as a word organised store, that is to say, it includes separate drive conductors for each word. To simplify the switching problem of addressing a store containing 2048 binary words of information the addresses of the store are divided into 32 X-numbers and 64 Y-numbers. In operation of the store, to initiate the application of an interrogating signal to a selected drive conductor a negative signal is applied to one of the conductors X1, X2 . . . X32 selected in response to the X-numbers of the address, to turn off the associated transistor TX, the transistors TX being normally conducting. The positive voltage pulse set up at the collector of the selected transistor TX is transmitted down the corresponding one of the conductors C1, C2 . . . C32 from which it is applied to the bases of 64 of the 2048 transistors T which constitute the driving means. The Y selection signal is applied to one of the terminals Y1, Y2 . . . Y64, selected in response to the Y-number of the address, from which it is applied to the base of a corresponding transistor TY to cause it to conduct. Connected to the collector of each of the transistors TY is a respective group of 32 transistors T. Only the transistors T of the selected group have their emitter electrodes connected to the negative supply and only one transistor in each of the 64 groups of transistors T is connected to the selected one of the conductors C, and therefore only one of the transistors T produces a current pulse in the drive conductor D connected to its collector electrode. The transistors TX and the transistors TY constitute selection means for selecting a particular drive conductor.

A problem which the present invention sets out to solve arises because the lengths of the digit drive conductors DD and the sense conductors S are so large in relation to the speed of operation of the store that the delay between the application of a signal to a drive conductor D to interrogate a selected row of storage elements and the appearance of the signals induced in the sense conductors S at the inputs of the read amplifiers A as a result of the interrogation, interferes with the strobing of the output signal. This delay is not constant but is dependent on the length of the conductor S between the selected row elements E and the amplifiers A. Moreover, the signal which is initially used for interrogation and subsequently to condition the store for the subsequent writing operation has to be of sufficient duration to accommodate variation in the time of arrival of a digit drive signal at the selected row of storage elements as to lead to an undesirable slowing of the operation of the store.

In accordance with the embodiment of the invention shown in the drawing the conductors C are substantially co-extensive with the conductors DD and S so that the time delay between the application of a signal to the selected one of the terminals X1, X2 . . . X32 and the application of an interrogating and conditioning signal on the selected one of the drive conductors D is substantially equal to the time delay imposed by the conductors DD on the digit drive signals and is complementary with the time delay between the application of the interrogating signal to the selected conductor D and the appearance of the corresponding output signals at the amplifiers A. As a result, the sum of the time intervals from the initiation of the operation of address selection to the application of the resultant interrogating signal to the selected group of storage elements and from said resultant interrogating signal to the appearance of the resultant data signals at the read amplifiers is substantially constant whichever group of storage elements is interrogated. To accommodate the spread in time of arrival of the voltage pulses from the transistors TX at the bases of the transistors T it is desirable to make the Y signal of longer duration than the X signal. A strobing signal for selecting only that part of the output signals from the store which represents the stored digits may conveniently be derived from the X signal to appear at a constant interval of time thereafter.

The collector loads B of the transistors TX and the terminating loads L of the conductors C are chosen to be equal to the characteristic impedance of the lines formed by the conductors C. The input capacities of the transistors T as seen from the conductors C form part of the delay lines comprising the conductors C. Because the selected one of the transistors TX is turned off to launch a positive pulse down the delay line, the source impedance of this positive pulse is the resistance of a load B, which is equal to the characteristic impedance of the delay line thus avoiding reflections which might interfere with the operation of the circuit.

Although the invention has been described with respect to a specific embodiment comprising thin film magnetic elements, clearly it may also be applied to other forms of store such as, for example, super-conductive stores, and many other modifications may be made without departing from the invention.

What I claim is:

1. A matrix store
(a) including an array of storage elements comprising a plurality of groups of said storage elements,
(b) interrogating means for applying an interrogating signal to a respective group of storage elements,
(c) a plurality of sense conductors associated with said storage elements for obtaining signals representing data from an interrogated group of storage elements,
(d) a read amplifier connected to each of said sense conductors,
(e) the data signals appearing at said read amplifiers after a first time interval depending on the length of the sense conductors from the respective group of storage elements to the read amplifiers, said first time interval being different for different groups of storage elements,
(f) selection means for causing said interrogating means to apply an interrogation signal to a selected group of storage elements,
(g) said selection means including delay means for delaying the application of the interrogating signal to the selected group of storage elements after initiation of the operation of said selection means by a second time interval complementary to said first time interval for the respective group of storage elements, so that
(h) the sum of said first mentioned time and said second mentioned time interval is substantially constant whichever group of storage elements is interrogated.

2. A store according to claim 1 wherein said storage elements comprise elements of thin film magnetic material.

3. A store according to claim 1 further including
(a) a plurality of digit drive conductors each corresponding to a respective sense conductor and associated with the same storage elements as the respective sense conductor, and
(b) digit drive means for selectively applying signals to said digit drive conductors to insert data into said storage elements.

4. A store according to claim 1 in which said selection means includes delay lines of which the lumped capacities are provided by input circuits of interrogating means.

5. A matrix store
(a) including an array of storage elements comprising a plurality of groups of said storage elements,
(b) interrogating means for applying an interrogating signal to a respective group of storage elements,
(c) a plurality of sense couductors associated with said storage elements for obtaining signals representing data from an interrogated group of storage elements,
(d) a read amplifier connected to each of said sense conductors,
(e) the data signals appearing at said read amplifiers after a first time interval depending on the length of the sense conductors from the respective group of storage elements to the read amplifiers, said first time interval being different for different groups of storage elements,
(f) selection means for causing said interrogating means to apply an interrogation signal to a selected group of storage elements,
(g) said selection means including delay means for delaying the application of the interrogating signal to the selected group of storage elements after initiation of the operation of said selection means by a second time interval complementary to said first time interval for the respective group of storage elements, so that
(h) the sum of said first mentioned time and said second mentioned time interval is substantially constant whichever group of storage elements is interrogated, in which said interrogating means includes
(i) a plurality of gating devices one for each group of storage elements, the gating devices being arranged in a plurality of sets,
(j) a plurality of delay lines constituting said delay means, one for each of said sets of gating devices and connecting the respective set of said selection means,
(k) said selection means including means for applying signals to a selected one of said delay lines, and further means for enabling a selected gating device of the respective set to apply said signal as an interrogating signal to the selected group of storage elements.

6. A matrix store
(a) including an array of storage elements comprising a plurality of groups of said storage elements,
(b) interrogating means for applying an interrogating signal to a respective group of storage elements,
(c) a plurality of sense conductors associated with said storage elements for obtaining signals representing data from an interrogated group of storage elements,
(d) a read amplifier connected to each of said sense conductors,
(e) the data signals appearing at said read amplifiers after a first time interval depending on the length of the sense conductors from the respective group of storage elements to the read amplifiers, said first time interval being different for different groups of storage elements,
(f) selection means for causing said interrogating means to apply an interrogation signal to a selected group of storage elements,
(g) said selection means including delay means for delaying the application of the interrogating signal to the selected group of storage elements after initiation of the operation of said selection means by a second time interval complementary to said first time interval for the respective group of storage elements, so that
(h) the sum of said first mentioned time and said second mentioned time interval is substantially constant which ever group of storage elements is interrogated,
(i) a plurality of digit drive conductors each corresponding to a respective sense conductor and associated with the same storage elements as the respective sense conductor, and
(j) digit drive means for selectively applying signals to said digit drive conductors to insert data into said storage elements, in which
(k) said digit drive means are connected to the ends of said digit drive conductors remote from the ends of said sense conductors which are connected to said read amplifiers,
(l) said digit drive conductors being of such length that the interval of time between the initiation of operation of said selection means and the application of the resultant interrogating signal to a particular group of storage elements is substantially the same as the interval of time between the emission of digit drive signals from said digit drive means and its arrival at the particular group of storage elements.

References Cited

UNITED STATES PATENTS

| | | | |
|---|---|---|---|
| 3,142,049 | 7/1964 | Crawford ---------- | 340—174 |
| 3,414,890 | 12/1968 | Schwartz ----------- | 340—174 |

TERRELL W. FEARS, Primary Examiner

U.S. Cl. X.R.

340—166